US010217577B2

(12) United States Patent
Strauss et al.

(10) Patent No.: US 10,217,577 B2
(45) Date of Patent: Feb. 26, 2019

(54) REMOTE CONTROL WITH CONFIGURABLE BUTTONS

(71) Applicant: Roku, Inc., Los Gatos, CA (US)

(72) Inventors: William Daniel Strauss, Santa Clara, CA (US); Scott Edward De Haas, Saratoga, CA (US); Gregory Mack Garner, Springdale, AR (US); Jeffrey John Peters, Pleasant Hill, CA (US); Anthony Wood, Palo Alto, CA (US)

(73) Assignee: Roku, Inc., Los Gatos, CA (US)

( * ) Notice: Subject to any disclaimer, the term of this patent is extended or adjusted under 35 U.S.C. 154(b) by 66 days.

(21) Appl. No.: 15/477,275

(22) Filed: Apr. 3, 2017

(65) Prior Publication Data

US 2018/0286607 A1 Oct. 4, 2018

(51) Int. Cl.
*G06K 19/06* (2006.01)
*H01H 13/83* (2006.01)
*H05K 5/00* (2006.01)
*G08C 17/02* (2006.01)
*G06K 19/077* (2006.01)
*G06K 19/07* (2006.01)

(52) U.S. Cl.
CPC ......... *H01H 13/83* (2013.01); *G06K 19/0702* (2013.01); *G06K 19/0719* (2013.01);
(Continued)

(58) Field of Classification Search
CPC ........ G06F 3/02; G06F 3/0202; G06F 3/0219; G06F 3/0224; G06F 3/0238; H01H 13/70;
(Continued)

(56) References Cited

U.S. PATENT DOCUMENTS 5,146,615 A * 9/1992 Hodsdon .............. H04B 1/3833
345/168
5,150,118 A * 9/1992 Finkle .................... H01H 13/70
341/22

(Continued)

OTHER PUBLICATIONS

International Search Report and Written Opinion of the International Searching Authority dated Apr. 23, 2018 in International Application No. PCT/US18/24507 (9 pages).

*Primary Examiner* — Steven S Paik
*Assistant Examiner* — April Taylor
(74) *Attorney, Agent, or Firm* — Sterne, Kessler, Goldstein & Fox, PLLC

(57) ABSTRACT

Described herein are several examples of an apparatus that features receptacles configured to accept interchangeable buttons. Each of the interchangeable buttons has a receptacle interface on a first side, which allows them to electrically connect to and communicate with the aforementioned apparatus, and a unique user-perceivable label on a second side. Electronic elements embedded in each interchangeable button, or alternatively located on its first side, correspond to a unique user-perceivable label. Based on these electronic elements, the apparatus recognizes each button individually, and identifies their user-perceivable label. As a result, the interchangeable buttons may be re-positioned on the apparatus and maintain their intended functionality according to their user-perceivable label. In addition, new interchangeable buttons with different user-perceivable labels and new functionality, according to their labels, can be introduced to the apparatus.

17 Claims, 11 Drawing Sheets

(52) U.S. Cl.
CPC ....... *G06K 19/07732* (2013.01); *G08C 17/02* (2013.01); *H05K 5/0017* (2013.01); *G08C 2201/30* (2013.01)

(58) Field of Classification Search
CPC ............. H01H 13/705; H01H 13/7057; H01H 13/7065; H01H 2221/00; H01H 2221/32; H01H 2221/34; H01H 2221/066; H01H 2231/032; H01H 2231/036
See application file for complete search history.

(56) References Cited

U.S. PATENT DOCUMENTS

| | | | | |
|---|---|---|---|---|
| 5,579,002 | A * | 11/1996 | Iggulden | H01H 13/70 200/5 A |
| 5,865,546 | A * | 2/1999 | Ganthier | G06F 3/0202 341/22 |
| 6,965,511 | B2 * | 11/2005 | Rudd | G06F 3/0202 200/5 A |
| 7,157,651 | B2 * | 1/2007 | Rix | G06F 3/0202 200/341 |
| 9,524,033 | B2 * | 12/2016 | Miller | G06F 3/0202 |
| 2007/0101386 | A1 * | 5/2007 | Oranim | G06F 3/0219 725/113 |
| 2007/0108034 | A1 * | 5/2007 | Rix | G06F 3/0202 200/520 |
| 2008/0021807 | A1 * | 1/2008 | Danko | G06F 1/1624 705/37 |
| 2009/0073004 | A1 * | 3/2009 | Lutnick | G06F 3/0219 341/23 |
| 2016/0266658 | A1 * | 9/2016 | Chang | G06F 3/0202 |

\* cited by examiner

1000

```
                                                              1010
┌─────────────────────────────────────────────┐
│ The user selects which interchangeable buttons │
│ will use, and inserts them to the available  │
│ receptacles in the order of preference       │
└─────────────────────────────────────────────┘
                      │
                      ▼                        1020
┌─────────────────────────────────────────────┐
│ When an inserted button is pressed, the remote│
│ control identifies the button from the RFID chip,│
│ or the one or more electrical elements of the│
│ button                                       │
└─────────────────────────────────────────────┘
                      │
                      ▼                        1030
┌─────────────────────────────────────────────┐
│ The remote control transmits a signal to the │
│ media device based at least in part on the RFID│
│ chip, or the one or more electrical elements of│
│ the button                                   │
└─────────────────────────────────────────────┘
                      │
                      ▼                        1040
┌─────────────────────────────────────────────┐
│ The media device, based on the received signal,│
│ identifies the button and its unique user-   │
│ perceivable label according to a stored database│
└─────────────────────────────────────────────┘
                      │
                      ▼                        1050
┌─────────────────────────────────────────────┐
│ The media service sends a command to the     │
│ network to request content related to the    │
│ unique user-perceivable label                │
└─────────────────────────────────────────────┘
```

FIG. 10

REMOTE CONTROL WITH CONFIGURABLE BUTTONS

BACKGROUND

Field

This disclosure is generally related to remote control devices, or any other devices, that feature configurable and interchangeable pre-labeled buttons. These remote control devices may be used to control media systems, for example.

Background

In today's world, on-demand availability of content—such as movies, TV shows and music, to name just a few examples—is commonplace. Several commercially available media systems are currently in the market that provide such on-demand services. Often these systems come from the manufacturer with remote control devices that have a number of pre-selected fixed, pre-labeled shortcut buttons that each corresponds to an online commercial streaming service or vendor. However, with such control devices, the user does not have the ability to re-arrange these buttons according to preference, or replace them with different ones that provide shortcuts to more favorable online commercial streaming content.

SUMMARY

Provided herein are remote control devices of media systems that allow a user to customize the button layout of the remote control devices by re-arranging pre-labeled and pre-configured buttons according to preference, or entirely replacing them with different ones.

An embodiment is directed to an apparatus featuring a number of interchangeable pre-labeled and pre-configured buttons that each has an embedded Radio Frequency Identification (RFID) chip that corresponds to a unique user-perceivable label. The apparatus allows the user to re-arrange the aforementioned buttons in the apparatus according to preference, or replace them with different pre-labeled buttons. In a non-limiting embodiment, the apparatus may be a remote control device of a media system.

Another embodiment is directed to a remote control featuring a number of interchangeable pre-labeled and pre-configured buttons that each has one or more embedded electrical elements that correspond to a unique user-perceivable label. The apparatus allows the user to re-arrange the aforementioned buttons according to preference, or replace them with different pre-labeled buttons. In a non-limiting embodiment, the one or more electrical elements may be passive elements, such as resistors, capacitors, inductors, diodes and the like. In another non-limiting embodiment, the one or more electrical elements may be active elements, such as transistors, silicon-controlled rectifiers (SCRs) and the like. Furthermore, the electrical elements may be a combination of passive and active elements.

Another embodiment is directed to a remote control device featuring a number of interchangeable pre-labeled and pre-configured buttons that each has one or more electrical elements disposed or formed on an exposed surface of the button, wherein the electrical elements correspond to a unique user-perceivable label. The apparatus allows the user to re-arrange the aforementioned buttons according to preference, or replace them with different pre-labeled buttons. In a non-limiting embodiment, the one or more electrical elements may be passive elements, such as resistors, capacitors, inductors, diodes and the like, or active elements, such as transistors, silicon-controlled rectifiers (SCRs) and the like, or combination of thereof.

BRIEF DESCRIPTION OF THE FIGURES

Aspects of the present disclosure may be understood from the following detailed description when read with the accompanying figures. It is noted that various features in the figures may not be drawn to scale. In fact, the dimensions of the various features may be arbitrarily increased or reduced for clarity of discussion.

FIG. 10 shows a flowchart for enabling a user to customize the button layout of a remote control by selecting and/or re-arranging pre-labeled buttons according to the user's preference, according to some embodiments.

Figure 1:
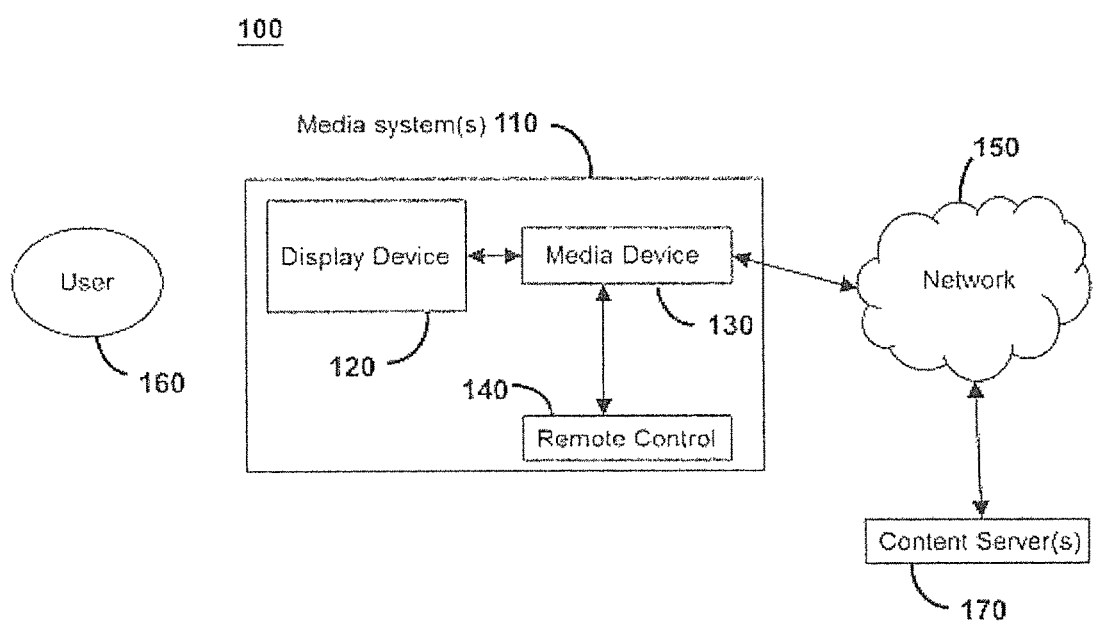
FIG. 1 is a block diagram of a multimedia environment that includes media system(s) and content server(s), according to some embodiments.

In the drawings, like reference numbers generally indicate identical or similar elements. In addition, the present disclosure may repeat reference numerals in the various examples. Generally, the left-most digits) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

FIG. 1 shows an exemplary multimedia environment 100. In a non-limiting example, multimedia environment 100 is a streaming media environment.

Multimedia environment 100 may include one or more media systems 110, and one or more content servers 170, communicatively coupled via a network 150. Network 150 can include, without limitation, wired and/or wireless intranet, extranet, Internet, cellular, Bluetooth and/or any other short range, long range, local, regional, global communications network, as well as any combination thereof.

Media system 110 may include a display device 120, media device 130 and remote control 140. Display device 120 may be a monitor, television, computer, smart phone, tablet, and/or projector, to name just a few examples. Media device 130 may be a streaming media device, DVD device, audio/video playback device, cable box, and/or digital video recording device, to name just a few examples. In some embodiments, the media device 130 can be a part of, integrated with, operatively coupled to, and/or connected to display device 120. The media device 130 may be configured to communicate with network 150.

A user 160 may interact with media system 110 via remote control 140. Remote control 140 can be any component, part, apparatus or method for controlling media device 130 and/or display device 120, such as a remote control, a smartphone, a touchpad, a computer, a keyboard or integrated control buttons on a unit, to name just a few examples.

Content servers 170 may each include databases to store content (not shown) and metadata (not shown). Content servers 170 may include any combination of music, videos, movies, TV programs, multimedia, images, still pictures, text, graphics, gaming applications, advertisements, software, and/or any other content or data objects in electronic form.

Figure 2:
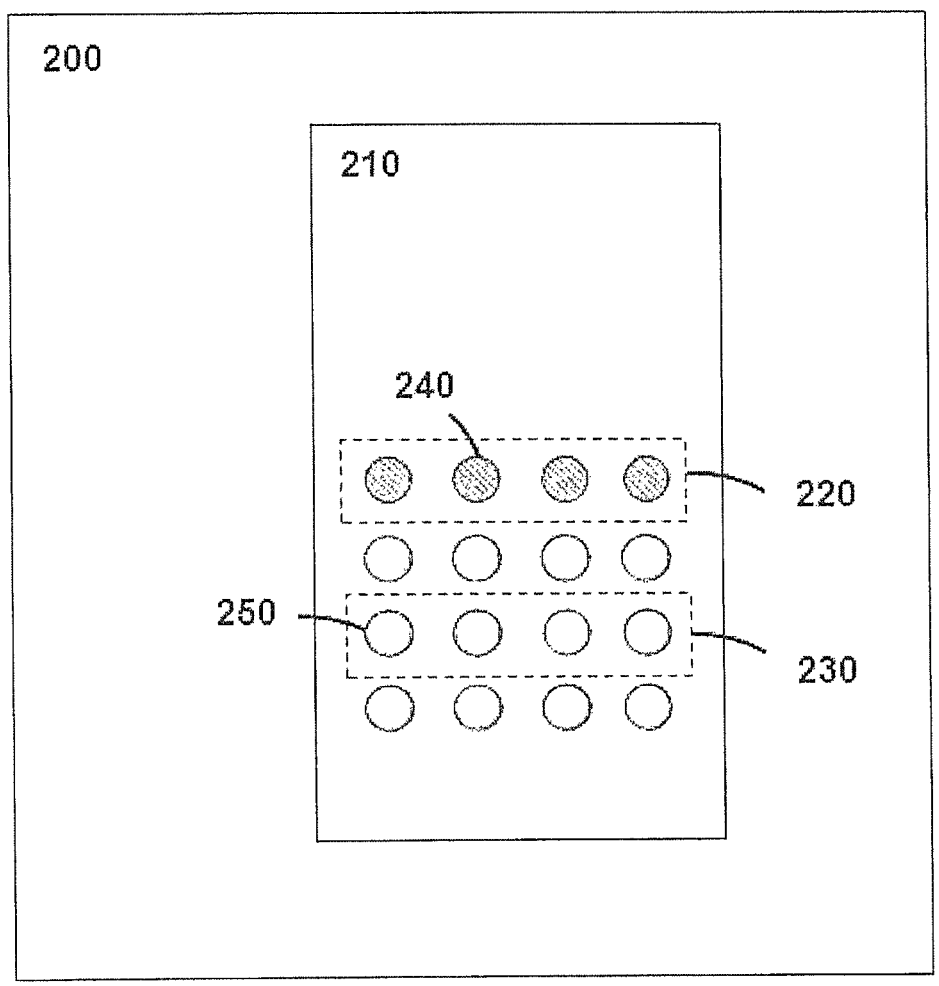
FIG. 2 illustrates an apparatus configured to accept user selectable and arrangeable buttons, according to some embodiments.

FIG. 2 shows an exemplary apparatus (or device or component) 200 which includes a platform 210. In some embodiments, apparatus 200 is an implementation of remote control 140 of media system 110 of FIG. 1. In some embodiments, platform 210 is or includes a printed circuit board which further includes additional electronic components (not shown) that enable the operation of apparatus 200.

In some embodiments, platform 210 includes at least four receptacles 240 that are configured to receive a receptacle interface side of an interchangeable button 250. In the example of FIG. 2, platform 210 has 16 receptacles 240 organized into 4 rows. However, platform 210 is not limited to this example embodiment, and may have any number of receptacles 240 arranged in any pattern.

As a non-limiting example, row 230 shows four interchangeable buttons 250 inserted into receptacles 240. In some embodiments, additional interchangeable buttons 250 may be inserted by users into any available (i.e., empty) receptacles 240, like in row 220. In another embodiment, interchangeable buttons 250 may be repositioned to any of the available receptacles according to user's preference.

In another embodiment, any row of receptacles 240, such as row 230, may receive an interchangeable panel of 4 buttons 250 that is inserted into a row with available receptacles, such as receptacle row 220. In this embodiment, the buttons of the panel are fixed on the interchangeable panel in a predetermined order and are not interchangeable. However, the panels themselves are interchangeable and may be repositioned across different rows of available receptacles. In some embodiments, each interchangeable panel may have two or more fixed buttons; the number of buttons in a panel can be the same as or less than the number of receptacles in a row.

Once an interchangeable button 250 is inserted into a receptacle 240, the interchangeable button 250 becomes mechanically integrated with platform 210 and an electrical communication is established between them.

Figure 3:
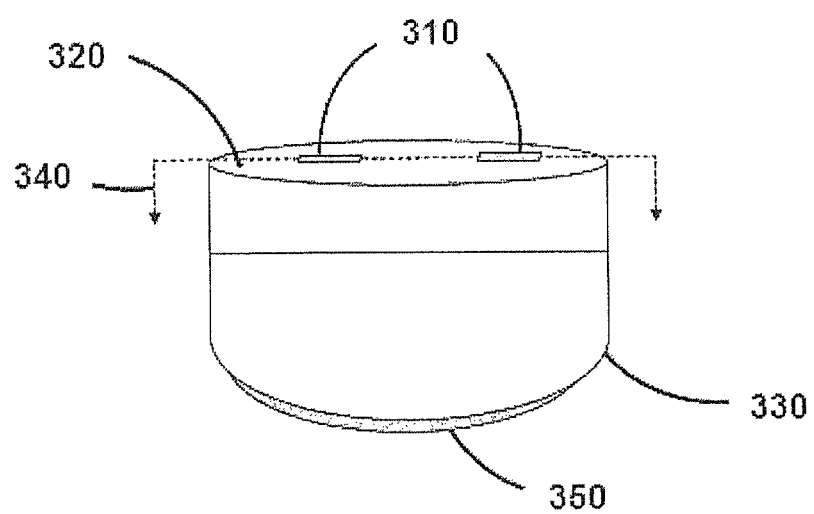
FIG. 3 is a perspective view of an interchangeable button, according to some embodiments.

FIG. 3 is a perspective view of an exemplary interchangeable button 300, which is similar to interchangeable button 250 of apparatus 200. In some embodiments, interchangeable button 300 has receptacle interface electrodes 310 on a first side 320, and a second side 330 that has a user-perceivable label 350. The user-perceivable label 350 can be, for example, a label with the logo of an online commercial streaming service or vendor, or an image denoting a function or command (such as fast forward, mute, play, etc.).

Figure 4:
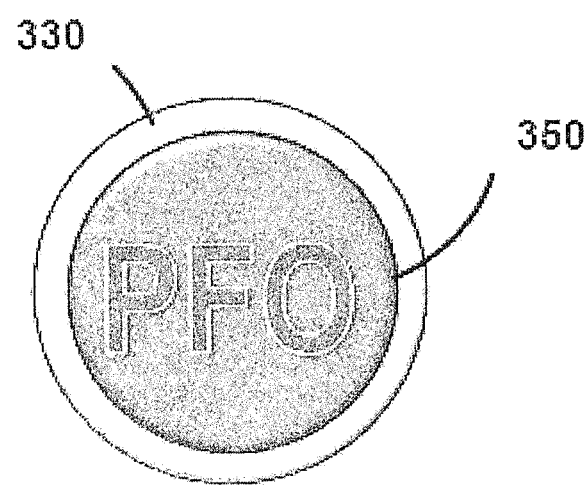
FIG. 4 is a top-down view of an interchangeable button with a unique user-perceivable label, according to some embodiments.

FIG. 4 is a top-down view of an interchangeable button 300 showing second side 330 with an exemplary user-perceivable label 350.

Figure 5:
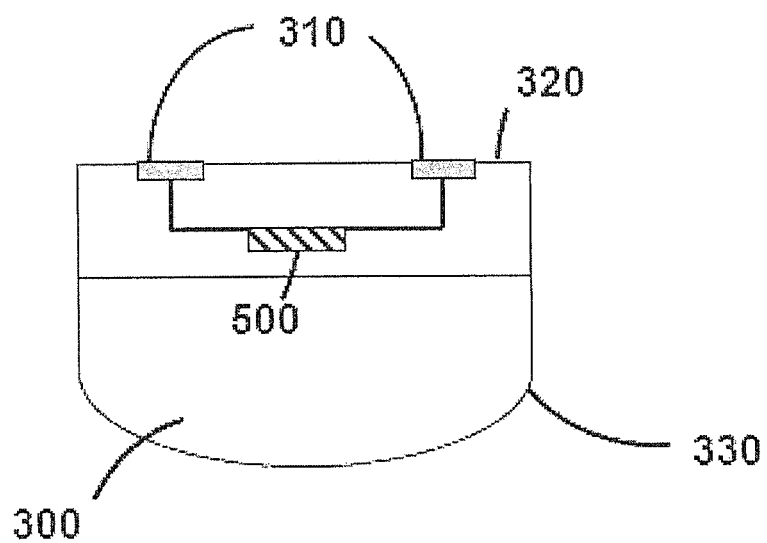
FIG. 5 is a cross-sectional view of an interchangeable button, according to some embodiments.

FIG. 5 is a cross-sectional view of an exemplary interchangeable button 300 taken along cut 340 of FIG. 3, according to some embodiments. Embedded in the button is element 500 which is configured to functionally correspond to the unique user-perceivable label 350 on second side 330, so that there is an established unique correlation between the label on the button and element 500. In some embodiments element 500 is an RFID chip that operates as a read-only RFID tag having a factory-assigned serial number that functionally corresponds to the unique user-perceivable label 350. The RFID tag may be either passive, active or battery-assisted passive. In other embodiments, element 500 may be one or more electrical elements that include passive elements, such as resistors, capacitors, inductors, and diodes; or active elements, such as transistors, silicon-controlled rectifiers (SCRs) and the like; or a combinations of thereof.

Figure 6:
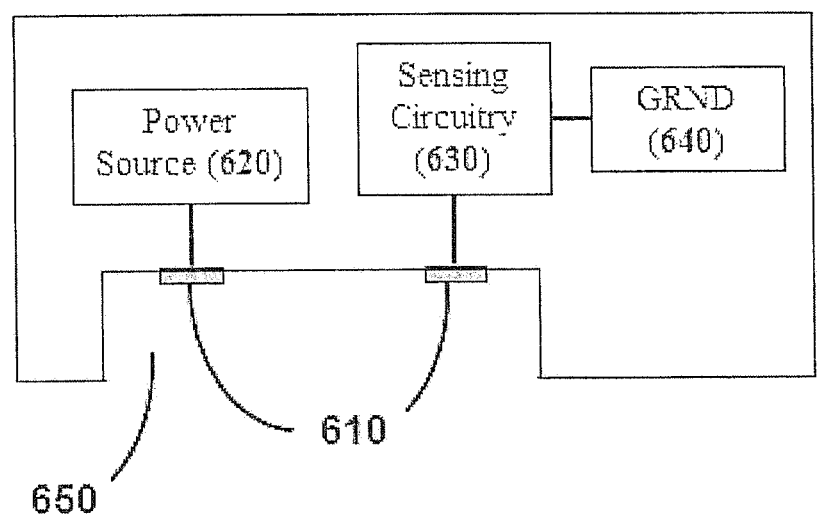
FIG. 6 is an internal block diagram of an exemplary receptacle, according to some embodiments.

FIG. 6 is an internal block diagram of an exemplary receptacle 600. Receptacle 600 may be an example embodiment of receptacle 240 of platform 210 of FIG. 2. Receptacle 600 has an opening 650 where button 300 may be inserted by the user. Opening 650 features receptacle interface electrodes 610 which are configured to electrically connect to receptacle interface electrodes 310 of interchangeable button 300 of FIG. 3. In some embodiments, one of the interface electrodes 610 is connected to a power source 620 (which may be a battery, for example), and the other to a sensing circuitry 630. Sensing circuitry 630 is further connected to an electrical ground 640. In some embodiments, each receptacle 600 is configured to provide power through power source 620 to element 500 when an interchangeable button is inserted to opening 650.

In some embodiments, element 500 is an RFID chip (tag), and sensing circuitry 630 may be, by example, an RFID reader configured to transmit an encoded radio signal to interrogate the RFID tag. The RFID tag receives the message, and then responds with its factory-assigned serial number which corresponds to and identifies its unique user-perceivable label 350. In some embodiments, element 500 is one or more electrical elements as described above, and sensing circuitry 630 may be configured to recognize a defining property of element 500. For example, if element 500 is a resistor, then sensing circuitry 630 may be configured to read the resistance of the resistor element by determining the voltage or current at sensing circuitry 620 (given the current/voltage output by the power source 610). As discussed above, the resistor's resistance corresponds to the button's label, so that buttons with different labels have resistors with different resistances. In some embodiments, platform 210 is configured to provide, for each receptacle 600 that has received an interchangeable button 300 in opening 650, an electrical signal based at least in part on a characteristic property of element 500. Based on this electrical signal, the remote control is able to identify the function of the button and then take corresponding action (as discussed below).

Figure 7:
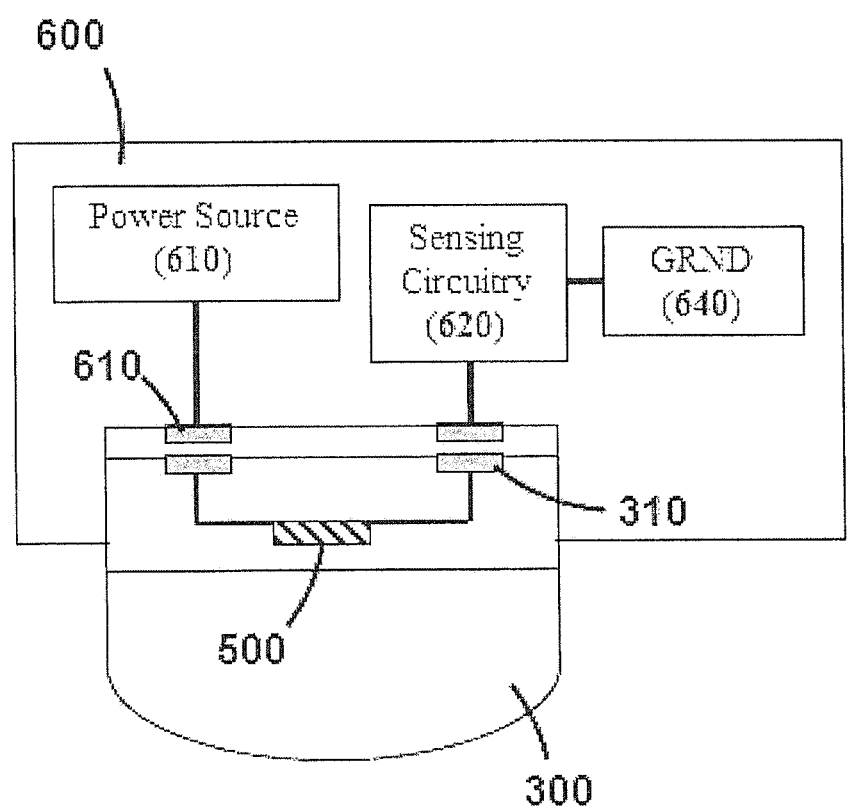
FIG. 7 is a cross-sectional view of an interchangeable button inserted into a receptacle.

FIG. 7 shows an exemplary interchangeable button 300 (shown in outline for illustrative purposes) inserted into opening 650 of an exemplary receptacle 600. Receptacle interface electrodes 610 of receptacle 600 and electrodes 310 of button 300 are aligned but not in contact. Electrical contact is established when button 300 is pressed by the user. At that point, power is provided to element 500 and sensing circuitry 620 reads/identifies element 500 which is uniquely associated with and identifies the button's label.

Figure 8:
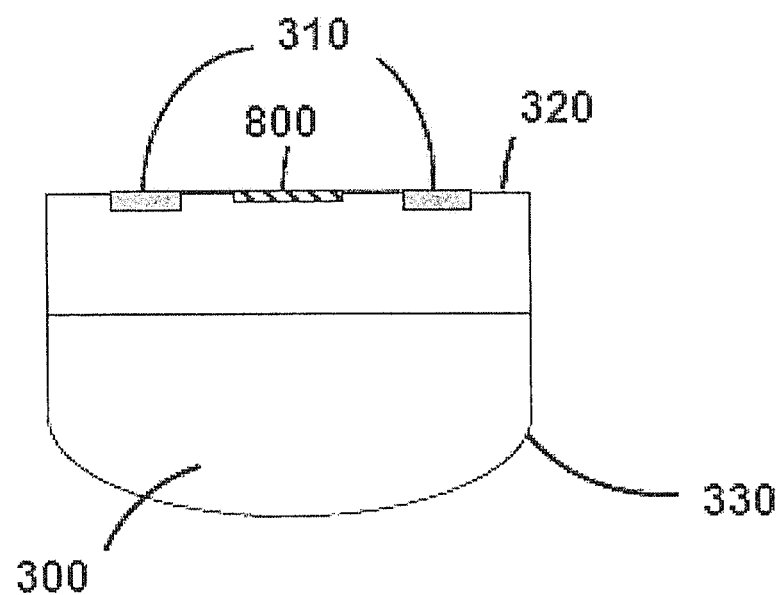
FIG. 8 is a cross-sectional view of an interchangeable button, according to some embodiments.

FIG. 8 is a cross-sectional view of an exemplary interchangeable button 300 taken along cut 340 of FIG. 3. Exemplary element 800 is one or more electrical elements disposed on first side 320 as opposed to being embedded into interchangeable button 300. In other embodiments, element 800, like element 500, may be one or more electrical elements that include passive elements, such as resistors, capacitors, inductors, and diodes; or active elements, such as transistors, silicon-controlled rectifiers (SCRs) and the like; or combinations of thereof. Like element 500, element 800 may be powered by its corresponding receptacle 600 according to some embodiments.

Figure 9:
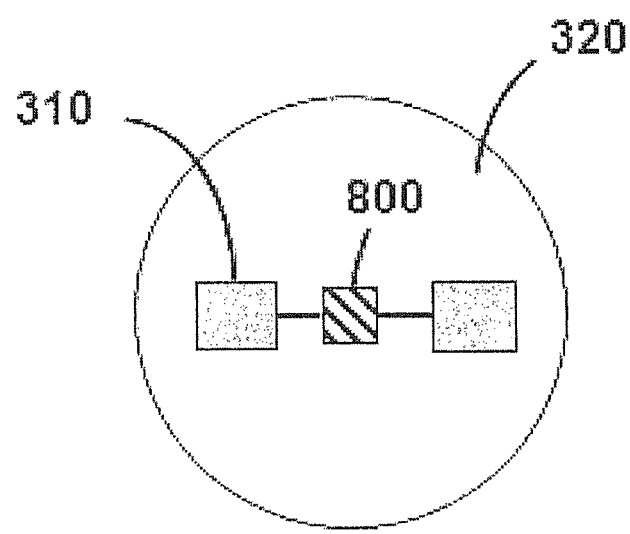
FIG. 9 is a top-down view of an interchangeable button's receptacle interface, according to some embodiments.

FIG. 9 is a top-down view of interchangeable button 300 showing the button's first side 320, receptacles interface electrodes 310 and element 800. Element 800 may be one or more electrical elements as described earlier disposed on first side 320.

The shape of receptacle opening 650 of FIG. 6 is configured to match the shape of the receptacle interface area of interchangeable button 300. However this requirement is not considered a limitation for the shape of second surface 330 of interchangeable button 300, which may have a different shape according to manufacturer's specifications. Therefore, receptacle opening 650 may have a different shape than the second surface 330 of interchangeable buttons 300 as long as their respective interface areas share the same shape. In addition, interchangeable buttons 300 (or 250 of FIG. 2) may be designed to have a distinct shape and/or size than the regular buttons on apparatus 200. Alternatively, the shape and/or size of an interchangeable button 300 (or 250 of FIG. 2) may depend on its user-perceivable label, hence functionality.

FIG. 10 illustrates a flowchart of the operation of the interchangeable buttons in a remote control according to the embodiments. Initially, the user acquires a media system with a remote control that features regular buttons and a series of empty receptacles that can receive interchangeable buttons. The media system also includes a plurality of interchangeable buttons, each having a unique user-perceivable label. These unique user-perceivable labels may be directed to content sources or functions. In a non-limiting example, content sources may be any online streaming services such as HBO, Netflix, ESPN GO, STARZ, AMAZON Prime to name a few examples. In a non-limiting example, functions may be multistep set-up functions of the media system, favorite settings of the media system, such as content skip, operating modes as well as any other media system/device functions.

The user may choose a number of interchangeable buttons according to functionality and insert each of them into any available receptacle, in any order. In addition, the user may change the order of the buttons, or replace them with new ones at any given time. An advantage of this approach is that each interchangeable button retains its functionality according to its label regardless of its position. In addition, this functionality may encourage the user to either use the commercial online streaming services according to the button's label, or buy additional buttons with labels that were not originally provided with the system; both of which provide a business advantage. Further, this approach overcomes the problem of fixed remote controls where buttons become outdated (for example, if the content source corresponding to one of the fixed buttons changes its name or goes out of business).

Some alternative embodiments may utilize software programming to assign different functions to fixed buttons on the remote control unit. However in software programmable assignment, the button label to function correlation cannot be established, and the user has to memorize the function of each programmable button since the label does not provide any information about the button's functionality. This can be particularly frustrating when multiple users are involved. In addition, software programming may be a complicated process for some users, whereas interchangeable buttons are intuitive and easy to use.

Accordingly, in 1010, the user initially selects a group of buttons to be used from the available group of buttons originally provided with the media system purchase. The user then inserts them into the available receptacles of the remote control unit in an order and arrangement preferred by the user. As mentioned earlier, the user may change the order of the buttons on the remote control, or exchange any button for a different one at any given time.

Each button features an RFID chip or one or more electronic element(s) that correspond to a unique user-perceivable label according to some embodiments. Therefore, there is an established unique correlation between the label on the button and its RFID chip or electronic element(s). For example, buttons with different labels have different RFID chips. Alternatively, if the button has an electronic element like a resistor, the buttons with different labels will have different resistor values. In one embodiment the RFID chip is embedded in the button. In another embodiment, one or more electronic elements are embedded in the button, or disposed on its first side 320. In another embodiment each receptacle is configured to provide power to the RFID chip of the inserted interchangeable buttons. The button's electronic elements may be any suitable passive or active element, or a combination of thereof. Examples of passive electronic elements are resistors, capacitors, inductors and the like. Examples of active electronic elements are transistors, silicon-controlled rectifiers (SCRs) and the like. These are, of course, merely examples and are not intended to be limiting.

In 1020 when one of the newly inserted button is pressed by the user, the remote control identifies the button by its RFID chip, or by its one or more electronic elements through a sensing circuitry. For example, referring to the example of FIG. 7, if the electronic element 500 is a resistor, the remote control will identify the button by determining its resistor value. In particular, in some embodiments, sensing circuitry 620, knowing the current/voltage output by power source 610, may determine the resistance of element 500 by sensing the voltage/current in the circuit completed when contacts 310 and 610 are engaged. Similarly, if the element 500 is a capacitor, the remote control will identify the button by reading the capacitance value of its capacitor. As long as the remote control can identify the interchangeable button as described above, the position of the button on the remote control is no longer important, as opposed to a traditional remote control device. Therefore, the button "carries" its user-perceivable label, or its intended functionality, regardless of its position on the remote control. This allows the user to change the position of a button while maintaining its intended functionality according to its user-perceivable label, or introduce new buttons with new labels and reposition them according to preference.

In 1030, the remote control transmits a signal to the media device. This signal is based at least in part on the RFID chip, or the one or more electrical elements of the button. For example, the signal may contain information about the RFID chip or the electrical elements in the button. In a non-limiting example, the signal may be a binary code corresponding to a relative parameter of the electrical element.

In 1040, the media device, based on the received signal, identifies which interchangeable button is pressed by its RFID chip information or electrical element information. The media device may then identify the button's unique user-perceivable label according to a correlation table stored in a database. The table may contain unique correlation information between the button's RFID, or electrical element, and its corresponding user-perceivable label.

In 1050, the media service performs the indicated operation by sending a command to the network to request content or access a content provided corresponding to the user-perceivable label of the button, or by otherwise executing the command indicated by the user-perceivable label of the button.

Figure 11:
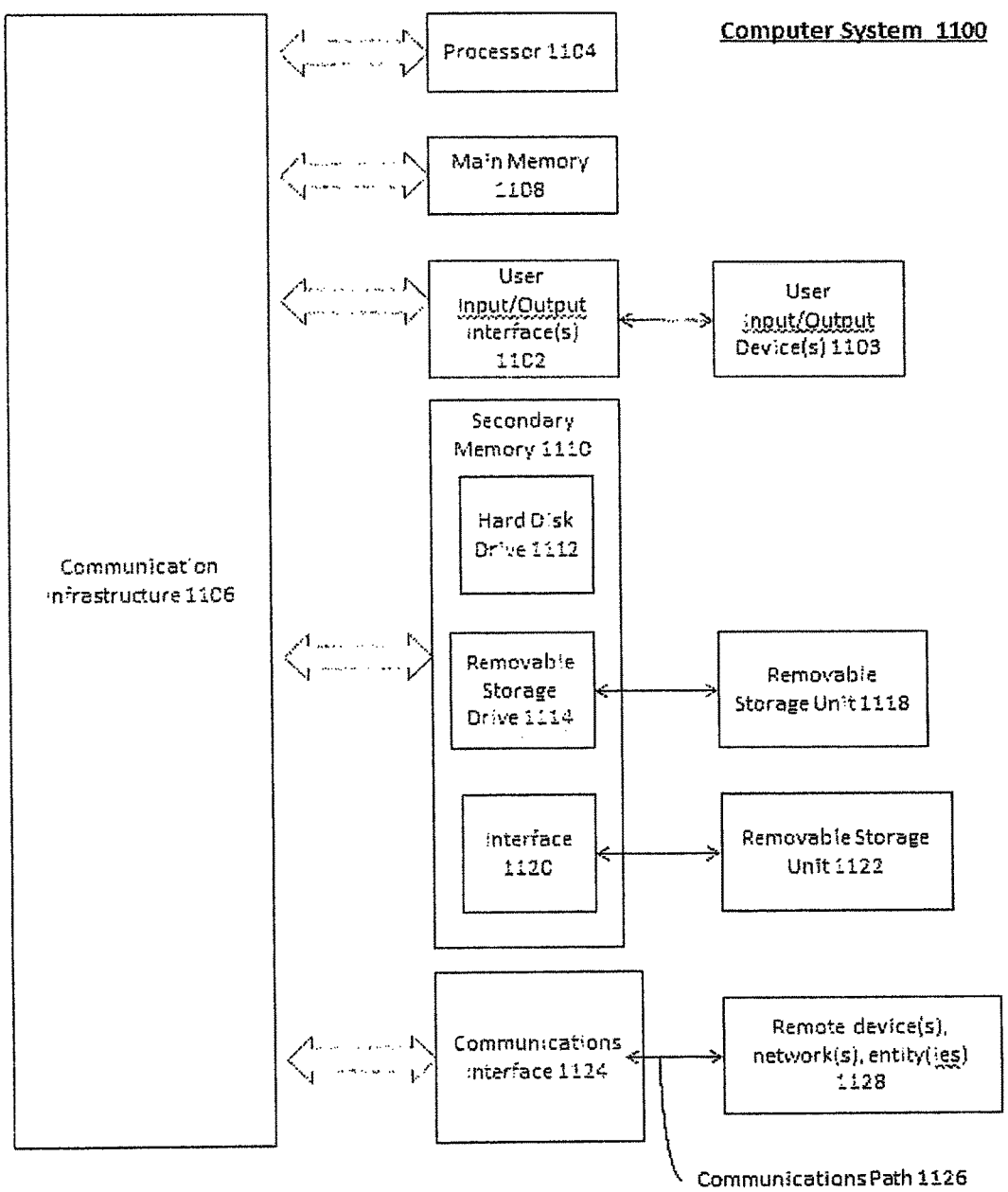
FIG. 11 is an exemplary computer system useful for implementing various embodiments or portions thereof.

Various embodiments can be implemented, for example, using one or more computer systems, such as computer system 1100 shown in FIG. 11. Computer system 1100 can be used, for example, to implement method 1000 of FIG. 10, or components of FIG. 1. Computer system 1100 can be any computer capable of performing the functions described herein.

Computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/ any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit arid associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

In an embodiment, a tangible apparatus or article of manufacture comprising a tangible computer useable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An apparatus, comprising,
at least one interchangeable panel having two or more fixed buttons in a predefined order, each fixed button having a receptacle interface on a first side, a unique user-perceivable label on a second side, and an RFID chip embedded therein, wherein the RFID chip is configured to correspond to the unique user-perceivable label of the fixed button;
a plurality of interchangeable buttons, each interchangeable button having a receptacle interface on a first side, a unique user-perceivable label on a second side, and an RFID chip embedded therein, the RFID chip configured to correspond to the unique user-perceivable label of the interchangeable button; and
a platform having a plurality of receptacles, each receptacle identically configured to receive the receptacle interface side of any of the interchangeable buttons and any of the two or more fixed buttons of the at least one interchangeable panel;
wherein the platform is configured to provide, for each receptacle having an interchangeable button or a fixed button inserted therein, an electrical signal based at least in part on the RFID chip embedded therein.

2. The apparatus of claim 1, wherein the platform comprises a printed circuit board within a housing.

3. The apparatus of claim 1, wherein each receptacle is configured to provide power to the RFID chip of any of the interchangeable buttons or the fixed buttons inserted therein.

4. The apparatus of claim 1, wherein the plurality of receptacles comprises at least four receptacles.

5. The apparatus of claim 1, wherein each interchangeable button is configured to be repositioned between available receptacles.

6. The apparatus of claim 1, wherein the apparatus is a remote control for an entertainment system.

7. A remote control for an entertainment system, comprising:
a plurality of buttons, each button having a receptacle interface on a first side, a unique user-perceivable label on a second side, and one or more electrical elements therein, the one or more electrical elements corresponding to the unique user-perceivable label of the button;
at least one interchangeable panel having two or more fixed buttons in a predefined order, each fixed button having an identical receptacle interface on a first side, a unique user-perceivable label on a second side, and one or more electrical elements embedded therein, the one or more electrical elements configured to correspond to the unique user-perceivable label of the fixed button; and
a platform having a plurality of receptacles, each receptacle configured to accommodate any of the buttons and any of the two or more fixed buttons of the at least one interchangeable panel;
wherein the platform is configured to provide, for each receptacle having a button or a fixed button engaged therewith, an electrical signal based at least in part on the one or more electrical elements of the button or the fixed button.

8. The remote control of claim 7, wherein the one or more electrical elements in the plurality of buttons and the two or more fixed buttons are passive electrical elements.

9. The remote control of claim 7, wherein the one or more electrical elements in the plurality of buttons and the two or more fixed buttons are active electrical elements.

10. The remote control of claim 7, wherein the one or more electrical elements in the plurality of buttons and the two or more fixed buttons are a combination of passive and active electrical elements.

11. The remote control of claim 7, wherein the plurality of receptacles comprises at least four receptacles.

12. The remote control of claim 7, wherein the platform comprises a printed circuit board within a housing.

13. The remote control of claim 7, wherein each button can be repositioned between available receptacles.

14. The remote control of claim 7, wherein each receptacle is configured to provide power to the one or more electrical elements of any of the buttons and of any of the two or more fixed buttons inserted therein.

15. A remote control for an entertainment system, comprising:
a plurality of buttons, each button having a receptacle interface on a first side, and a unique user-perceivable label on a second side, the receptacle interface having one or more electrical elements thereon, the one or more electrical elements corresponding to the unique user-perceivable label of the button;
at least one interchangeable panel having two or more fixed buttons in a predefined order, each fixed button having a receptacle interface on a first side, and a unique user-perceivable label on a second side, the receptacle interface having one or more electrical elements thereon, the one or more electrical elements corresponding to the unique user-perceivable label of the fixed button; and
a platform having a plurality of receptacles, each receptacle configured to accommodate any of the buttons and any of the two or more fixed buttons;
wherein the platform is configured to provide, for each receptacle having a button and a fixed button engaged therewith, an electrical signal based at least in part on the one or more electrical elements of the button or the fixed button.

16. The remote control of claim 15, wherein the platform comprises a printed circuit board within a housing.

17. The remote control of claim 15, wherein each receptacle is configured to provide power to the one or more electrical elements of any of the buttons and any of the two or more fixed buttons inserted therein.

* * * * *